US010919400B2

(12) United States Patent
Mathison

(10) Patent No.: US 10,919,400 B2
(45) Date of Patent: Feb. 16, 2021

(54) SYSTEMS FOR VALIDATING A FORMULA FOR DISPENSING HYDROGEN AND METHODS THEREOF

(71) Applicant: HONDA MOTOR CO., LTD., Tokyo (JP)

(72) Inventor: Steven R. Mathison, Rancho Palos Verdes, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 500 days.

(21) Appl. No.: 15/844,185

(22) Filed: Dec. 15, 2017

(65) Prior Publication Data

US 2019/0184847 A1 Jun. 20, 2019

(51) Int. Cl.
*B60L 50/72* (2019.01)
*F17C 13/02* (2006.01)
(Continued)

(52) U.S. Cl.
CPC ............ *B60L 50/72* (2019.02); *F17C 13/025* (2013.01); *F17C 13/028* (2013.01); *G05D 7/0617* (2013.01); *F17C 13/00* (2013.01); *F17C 2221/012* (2013.01); *F17C 2223/0123* (2013.01); *F17C 2223/036* (2013.01);
(Continued)

(58) Field of Classification Search
CPC ...... B60L 50/72; F17C 13/025; F17C 13/028; F17C 13/00; F17C 2221/012; F17C 2223/0123; F17C 2223/036; F17C 2225/0123; F17C 2225/036; F17C 2227/04; F17C 2250/032; F17C 2250/034; F17C 2250/043; F17C 2250/0439; F17C 2250/0473; F17C 2250/061; F17C 2250/0636; F17C 2265/065;
(Continued)

(56) References Cited

U.S. PATENT DOCUMENTS 9,122,821 B2 9/2015 McDaniel
9,605,804 B2 3/2017 Mathison
(Continued)

FOREIGN PATENT DOCUMENTS

CN 106156889 A 11/2016

OTHER PUBLICATIONS

Bhan, V., "Optimization of Hydrogen Filling Station," The University of Texas at Arlington, Aug. 2006.
(Continued)

*Primary Examiner* — Justin C Mikowski
(74) *Attorney, Agent, or Firm* — Arent Fox LLP

(57) ABSTRACT

Validating of a fill control formula used by a hydrogen dispenser for dispensing hydrogen is described. Template data of the hydrogen dispenser related to dispensing of hydrogen by the hydrogen dispenser over a period of time is received, as well as static parameter values. One or more fill operations for dispensing hydrogen to one or more hydrogen fuel tanks may be simulated based on the template data and static parameters, as well as based on the fill control formula utilized in the hydrogen dispenser. A comparison of one or more fill operation parameter values calculated by simulating the one or more fill operations and one or more values of one or more similar fill operation parameters in the template data may be output on a user interface.

17 Claims, 12 Drawing Sheets

(51) Int. Cl.
*G05D 7/06* (2006.01)
*F17C 13/00* (2006.01)

(52) U.S. Cl.
CPC .......................... *F17C 2225/0123* (2013.01); *F17C 2225/036* (2013.01); *F17C 2227/04* (2013.01); *F17C 2250/032* (2013.01); *F17C 2250/034* (2013.01); *F17C 2250/043* (2013.01); *F17C 2250/0439* (2013.01); *F17C 2250/0473* (2013.01); *F17C 2250/061* (2013.01); *F17C 2250/0636* (2013.01); *F17C 2265/065* (2013.01); *F17C 2270/0139* (2013.01); *F17C 2270/0184* (2013.01); *H01M 2250/20* (2013.01)

(58) Field of Classification Search
CPC ..... F17C 2270/0139; F17C 2270/0184; G05D 7/0617; H01M 2250/20
USPC ............................................................ 703/6
See application file for complete search history.

(56) References Cited

U.S. PATENT DOCUMENTS

| | | | | |
|---|---|---|---|---|
| 10,240,721 B2* | 3/2019 | Dawson | ...................... | F17C 5/06 |
| 2009/0205745 A1* | 8/2009 | Farese | ...................... | F17C 5/02 |
| | | | | 141/12 |
| 2014/0110017 A1* | 4/2014 | Gupta | ...................... | F17C 5/007 |
| | | | | 141/4 |
| 2014/0216599 A1 | 8/2014 | Loewenthal | | |
| 2014/0261874 A1* | 9/2014 | Mathison | ................ | F17C 5/007 |
| | | | | 141/11 |
| 2014/0263419 A1* | 9/2014 | Mathison | ................ | B67D 7/80 |
| | | | | 222/3 |
| 2014/0290790 A1* | 10/2014 | Mathison | ................ | F17C 5/06 |
| | | | | 141/4 |
| 2015/0308621 A1* | 10/2015 | Mathison | ................ | F17C 5/06 |
| | | | | 141/4 |
| 2018/0205102 A1* | 7/2018 | O'Brien | ................ | F17C 5/007 |

OTHER PUBLICATIONS

Deymi-Dashtebayaz, M., et al., "The Complete Modelling of the Filling Process of Hydrogen Onboard Vehicle Cylinders," Brazilian Journal of Chemical Engineering, vol. 33, No. 02, pp. 391-399, Apr.-Jun. 2016.

Farzaneh-Gord, M., et al., "Effects of Gas Types and Models on Optimized Gas Fuelling Station Reservoir's Pressure," Brazilian Journal of Chemical Engineering, vol. 30, No. 02, pp. 399-411, Apr.-Jun. 2013.

Nahavandi, N.N., et al., "Numerical simulation of filling process of natural gas onboard vehicle cylinder," Journal of the Brazilian Society of Mechanical Sciences and Engineering, 35, pp. 247-256, 2013.

* cited by examiner

| | |
|---|---|
| Save data sample file: | Template for station data |

Load station data — no file

300

| Field | Value | Unit |
|---|---|---|
| Dispenser Pressure Class | H70 ▶ | |
| Ambient Temperature (T_amb) | 20 | °C |
| CHSS Initial Pressure (P_initial) | 5 | MPa |
| CHSS Volume (CHSS_volume) | 100 | liters or ND (not determined) |
| ΔP_low measured? | no ▶ | |
| Flag Variable Cold Dispenser (CD) | FALSE ▶ | |
| Flag Variable TopOff used? | no ▶ | |
| PRR_CAP_Factor | 1.0 | - |
| MAT_expected | 240.15 | K |
| Ending Pressure Control Option | MC Method ▶ | |
| SOC_target | 95 | % |
| MP or Pstation used for comm end of fill? | MP ▶ | |
| Timestep i frequency (seconds) | 5 | s |
| Dual T_fuel measurements? | no ▶ | |
| Separate T_fuel values for MAT and h_ave? | no ▶ | |

PASS / FAIL Criteria for Protocol Calculations Check

PASS / FAIL Criteria for End-of-Fill Check

- Calculate
- Show calculated values
- Export calculated values
- Plot calculated values
- Show equations

| PASS / FAIL Criteria for End-of-Fill Check | — ☐ X |
|---|---|

Non-Comm Pressure Target Overshoot (Overshoot_non_comm)     0 MPa

Non-Comm Pressure Target Undershoot (Undershoot_non_comm)     0 MPa

Comm Pressure Target Overshoot (Overshoot_comm)     0 MPa

Comm Pressure Target Undershoot (Undershoot_comm)     0 MPa

☐ use values from CSA HGV 4.3 Standard

Results

| Parameter | Input/Value |
|---|---|
| Station Pressure Class | H70 |
| Ambient Temperature (Tamb) [°C] | 20 |
| CHSS Volume (CHSS_volume) [liters] | 100 |
| delta_p_low measured? | no |
| Flag Variable Cold Dispenser (CD) | no |
| Flag Variable TopOff used? | no |
| Ending Pressure Control Option | MC Method |
| MP or Pstation used for comm end of fill? | MP |
| Timestep I frequency [s] | 5 |
| Dual T_fuel measurements? | no |
| Tamb [°C] | 20 |
| P_initial [Mpa] | 5 |
| PRR_CAP_Factor [-] | 1 |
| MAT_expected [°C] | -33.0000 |

| CHSS Cap. Cat. | a | b | c | d |
|---|---|---|---|---|
| 49.7000 | 8.8071e-04 | -.04383 | 706010 | -3.667e+03 |
| 994000 | 0.0014 | -0.3660 | -44.8040 | -3.667e+03 |
| 174 | 0.0059 | -3.2295 | 5425790 | -2.568e+04 |
| 2486000 | -0.0023 | 3.2481 | -1.15e+03 | 12235 |

| Time[s] | Fueling Time Indic | Mass disp | Mass flow | Indicator. | Indicator. CHS |
|---|---|---|---|---|---|
| 0 | 0 | 0 | 0 | 0 | 1B:4-7 |
| 1 | 1 | .01000 | .01000 | 0 | 1B:4-7 |
| 2 | 1 | 5.1000 | 5.0000 | 0 | 1B:4-7 |
| 3 | 1 | 189000 | 138000 | 0 | 1B:4-7 |
| 4 | 1 | 303000 | 114000 | 0 | 1B:4-7 |
| 5 | 1 | 427000 | 124000 | 0 | 1B:4-7 |
| 6 | 1 | 551000 | 124000 | 0 | 1B:4-7 |
| 7 | 1 | 682000 | 131000 | 0 | 1B:4-7 |
| 8 | 1 | 806000 | 124000 | 0 | 1B:4-7 |
| 9 | 1 | 95 | 144000 | 0 | 1B:4-7 |
| 10 | 1 | 1088000 | 138000 | 0 | 1B:4-7 |
| 11 | 1 | 1233000 | 145000 | 0 | 1B:4-7 |
| 12 | 1 | 138 | 147000 | 0 | 1B:4-7 |
| 13 | 1 | 1547000 | 167000 | 0 | 1B:4-7 |
| 14 | 1 | 1712000 | 165000 | 0 | 1B:4-7 |
| 15 | 1 | 1866000 | 154000 | 0 | 1B:4-7 |
| 16 | 1 | 2033000 | 167000 | 0 | 1B:4-7 |
| 17 | 1 | 2203000 | 17.0000 | 0 | 1B:4-7 |

FIG. 6

SYSTEMS FOR VALIDATING A FORMULA FOR DISPENSING HYDROGEN AND METHODS THEREOF

BACKGROUND

Advances in hydrogen (H2) refueling methods may present an increased opportunity to reduce fueling times for vehicles while allowing more flexibility in H2 station designs. Generally, cost reduction may be an important factor when designing and building H2 infrastructure and should be taken into consideration when entering the fuel cell electric vehicle (FCEV) market. There may be numerous approaches when it comes to developing a hydrogen fueling method. For example, a constant pressure ramp rate approach may be used as provided in the SAE J2601-2014/2016 table based approach. The constant pressure ramp rate approach may use fixed inputs or boundary conditions in conjunction with a fueling model employing a finite element solution to the heat transfer, thermodynamics, and fluid dynamics, with the output being a target constant pressure ramp rate. Another approach for hydrogen fueling may be the variable pressure ramp rate approach as provided in the SAE J2601-2016 MC Formula based approach. The MC Formula variable pressure ramp rate approach may use fixed inputs or boundary conditions in conjunction with a fueling model employing a finite element solution to the heat transfer, thermodynamics, and fluid dynamics, with the output being a fueling time variable, t-final as a function of the ambient temperature and mass average fuel delivery temperature. The parameter t-final may be used in a pressure ramp rate equation to provide a variable pressure ramp rate throughout the fill.

To improve performance when filling a hydrogen tank, mechanisms have been developed for determining a gas final temperature as a function of initial conditions, enthalpy added, and the fueling time, allowing for the determination of a final pressure calculated to produce a state of charge of 100% within the compressed gas tank.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method for validating a fill control formula used by a hydrogen dispenser for dispensing hydrogen is provided. The method includes receiving template data of the hydrogen dispenser related to dispensing of hydrogen by the hydrogen dispenser over a period of time, where the template data includes one or more hydrogen dispensing parameter values. The method also includes initializing, via a user interface, one or more static parameter values related dispensing of hydrogen by the hydrogen dispenser. The method further includes simulating, based on the one or more hydrogen dispensing parameter values and the one or more static parameter values, one or more fill operations for dispensing hydrogen to one or more hydrogen fuel tanks based on the fill control formula utilized in the hydrogen dispenser, and outputting, to the user interface, a comparison of one or more fill operation parameter values calculated by simulating the one or more fill operations and one or more values of one or more similar fill operation parameters in the template data.

In another example, an apparatus for validating a fill control formula used by a hydrogen dispenser for dispensing hydrogen is provided. The apparatus includes a display, a memory, and at least one processor coupled to the memory. The at least one processor is configured to receive template data of the hydrogen dispenser related to dispensing of hydrogen by the hydrogen dispenser over a period of time, where the template data includes one or more hydrogen dispensing parameter values, and initialize, via a user interface displayed on the display, one or more static parameter values related dispensing of hydrogen by the hydrogen dispenser. The at least one processor is also configured to simulate, based on the one or more hydrogen dispensing parameter values and the one or more static parameter values, one or more fill operations for dispensing hydrogen to one or more hydrogen fuel tanks based on the fill control formula utilized in the hydrogen dispenser, and output, to the user interface displayed on the display, a comparison of one or more fill operation parameter values calculated by simulating the one or more fill operations and one or more values of one or more similar fill operation parameters in the template data.

In yet another aspect, a non-transitory computer-readable storage medium including computer-executable code for validating a fill control formula used by a hydrogen dispenser for dispensing hydrogen is provided. The code includes code for receiving template data of the hydrogen dispenser related to dispensing of hydrogen by the hydrogen dispenser over a period of time, where the template data includes one or more hydrogen dispensing parameter values, and initializing, via a user interface, one or more static parameter values related dispensing of hydrogen by the hydrogen dispenser. The code further includes code for simulating, based on the one or more hydrogen dispensing parameter values and the one or more static parameter values, one or more fill operations for dispensing hydrogen to one or more hydrogen fuel tanks based on the fill control formula utilized in the hydrogen dispenser, and outputting, to the user interface, a comparison of one or more fill operation parameter values calculated by simulating the one or more fill operations and one or more values of one or more similar fill operation parameters in the template data To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3 illustrates an example of a graphical user interface (GUI) for executing a validation tool according to aspects described herein;

FIG. 5 illustrates an example of a GUI for indicating pass/fail criteria for an end-of-fill check in simulating fill operations according to aspects described herein;

FIG. 6 illustrates an example of a GUI for displaying fill operation parameters in simulating fill operations according to aspects described herein;

DETAILED DESCRIPTION

Figure 1:
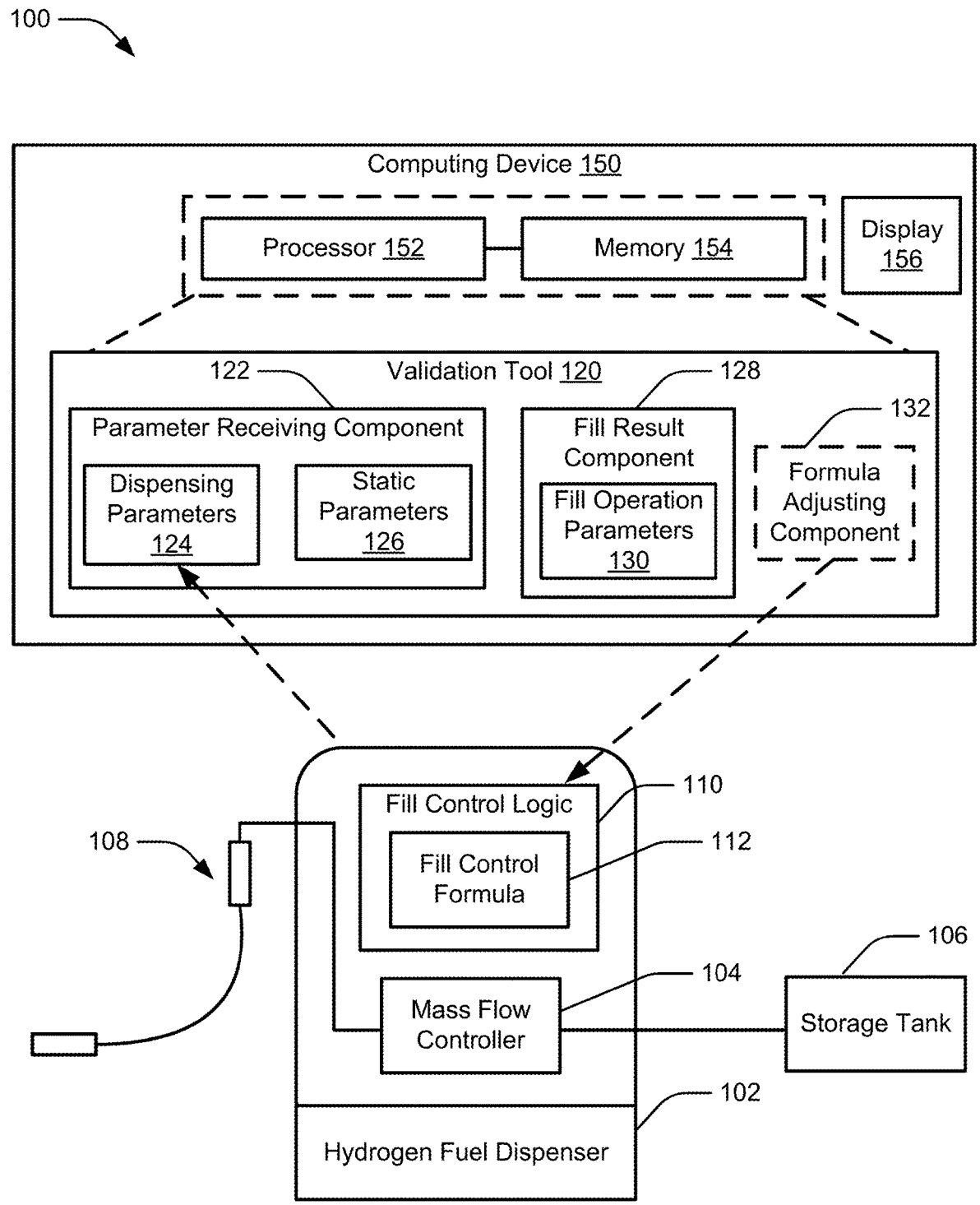
FIG. 1 illustrates an example of a hydrogen fuel dispenser and a validation tool according to aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are example systems and methods related to validating a formula used for dispensing hydrogen from a hydrogen dispenser, such as a hydrogen fuel pump. A hydrogen dispenser may operate according to an adaptive fueling protocol that may dynamically adjust rate of change in dispenser pressure (also referred to as a ramp rate (RR)) and/or an end of fill target pressure for a hydrogen fuel tank (also referred to as compressed hydrogen storage system (CHSS)) during filling of the fuel tank. The rate of change in dispenser pressure may be adjusted based on inputs measured by the fuel dispenser, such as an ambient temperature, an initial gas pressure in the CHSS, a measured gas pressure and temperature at the fuel dispenser, among other factors. To validate the formula used by the fuel dispenser, a validation tool may simulate one or more fill operations based on template data of a fuel dispenser dispensing hydrogen over a period of time. In addition, the validation tool may allow for specifying one or more static parameters related to dispensing hydrogen, and may perform simulation of hydrogen dispensing based on the template data and the static parameters. The validation tool may further compare output results of the simulation to results in the template data to determine whether the hydrogen dispenser is performing in accordance with parameters of a protocol (e.g., that normal working pressure of the CHSS less than 125% at any time during the fueling operation), whether end-of-fill control is within an acceptable tolerance, and/or whether the dispenser is operating within certain process limits or aborting fill operations where process limits are exceeded.

The term "memory," as used herein, may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, may include a connection by which entities are "operably connected", is one in which signals, physical communications, and/or logical communications may be sent and/or received. An operable connection may include a physical interface, a data interface and/or an electrical interface.

The term "processor," as used herein, may refer to a device that processes signals and performs general computing and arithmetic functions. Signals processed by the processor may include digital signals, data signals, computer instructions, processor instructions, messages, a bit, a bit stream, or other computing that may be received, transmitted and/or detected. A processor, for example, may include microprocessors, microcontrollers, digital signal processors (DSPs), field programmable gate arrays (FPGAs), programmable logic devices (PLDs), state machines, gated logic, discrete hardware circuits, system-on-a-chip (SoC), and other suitable hardware configured to perform the various functionality described herein.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

FIG. 1 illustrates an example of a system 100 for validating a formula used by a fuel dispenser for a fuel filling operation. System 100 may include a hydrogen fuel dispenser 102 having a mass flow controller 104 to control flow of gas from a storage tank 106 to a dispensing assembly 108. For example, the storage tank 106 may be an underground storage tank 106 that may serve multiple hydrogen fuel dispensers, a storage tank 106 within or otherwise associated with hydrogen fuel dispenser 102, etc. Dispenser assembly 108 may include other flow and/or safety mechanisms to facilitate dispensing fuel from the hydrogen fuel dispenser 102 to a fuel tank (not shown), such as a CHSS for a vehicle. As described further herein, the fuel tanks may have varying specifications, and thus may benefit from using different dispensing parameters. The hydrogen fuel dispenser 102 may also include fill control logic 110, which may be implemented in electronics within the hydrogen fuel dispenser to control the mass flow controller 104. For example, the fill control logic 110 may be implemented by a processor (e.g., a system-on-chip processor, a programmable logic controller (PLC), a processor that is part of a printed circuit board (PCB), etc.) and may include a memory for storing instructions and/or parameter values to execute the fill control logic 110.

The fill control logic 110, in this regard, may include a fill control formula 112 to calculate parameter values for controlling the mass flow controller 104 based on parameters input into the fill control formula 112. For example, the fill control formula 112 may receive or otherwise determine one or more parameters of the vehicle tank, such as an initial gas temperature, gas pressure, etc. (e.g., which may be determined by one or more measuring mechanisms of the dispenser assembly 108), one or more parameters related to the hydrogen fuel dispenser 102, such as an ambient temperature, delivered gas temperature, delivered gas pressure, etc. (e.g., which may be determined by one or more measuring mechanisms of the hydrogen fuel dispenser 102), and/or the like. The fill control formula 112 may accordingly determine one or more parameters for computing a formula to control the mass flow control 104 via fill control logic 110, such to dispense hydrogen from the storage tank 106 to the dispenser assembly 108 to fill a vehicle tank, where the parameters may include a pressure ramp rate (RR) for dynamically changing the target pressure of the delivered gas during the fuel filling operation. In a specific example, the fill control formula 112 may determine the RR for the mass flow controller 104 based at least in part on applying one or more coefficients determined based on the ambient temperature to a delivered gas pressure and/or tank gas pressure. For example, the fill control formula 112 may be generated to operate in conformance with one or more standards, such as Society of Automotive Engineers (SAE) Standard J2601—Fueling Protocols for Light Duty Gaseous Hydrogen Surface Vehicles. In some aspects, the fill control formula 112 may correspond to an MC Formula fill and a table-based protocol fill, among others.

The validation tool 120 may simulate one or more fill operations based on one or more dispensing parameters 124 (e.g., hydrogen dispensing parameter values) related to the hydrogen fuel dispenser 102. For example, the hydrogen fuel dispenser 102 may log parameter values related to dispensing hydrogen during one or more fill operations, and at least a portion of this data may be provided to the validation tool 120 via parameter receiving component 122 (e.g., by the hydrogen fuel dispenser 102 via an interface with the validation tool 120 or otherwise). The parameter receiving component 122 may also facilitate entry of one or more static parameters 126 via an interface (e.g., a user interface displayed on a computing device with which a user may interact to input the one or more static parameters 126. For example, the dispensing parameters 124 may include parameters related to (and reported by) a given vehicle tank, such as a measured gas pressure at the vehicle tank during the fill operation, measured gas temperature at the vehicle tank during the fill operation, a fueling command from the vehicle tank indicating whether or not to execute the fill operation, among other parameters. The dispensing parameters 124 may also include, for example, an outlet gas temperature at the hydrogen fuel dispenser 102, an outlet gas pressure at the hydrogen fuel dispenser 102, a fueling time for the hydrogen dispensing, etc. The static parameters 126 may include one or more of an ambient temperature and an initial gas pressure, among others. In other examples, the static parameters 126 may include one or more tolerance values for the dispensing parameters 124 and/or fill operation parameters 130, as described further herein.

As part of simulation the one or more fill operations, the validation tool 120 may output fill operation parameters 130 via a fill result component 128. The one or more fill operation parameters 130 may include values computed during the simulation based on the dispensing parameters 124, static parameters 126, the fill control formula used by the validation tool 120 (which may be programmed in the validation tool 120, received from the hydrogen fuel dispenser 102, and/or the like), among other parameters. In an example, fill result component 128 may compare the fill operation parameters 130 with similar parameters that may be received as part of the dispensing parameters 124 of the hydrogen fuel dispenser 102 (e.g., fill operation parameters related to hydrogen dispensing performed over a period of time). Fill result component 128, in an example, may compare the fill operation parameters 130 computed by the fill result component 128 to the similar fill operation parameters received in the dispensing parameters 124 to determine whether the fill control formula 112 of the hydrogen fuel dispenser 102 is operating in such a manner as to satisfy protocol calculations or constraints of the formula (e.g., constraints specified in SAE J2601), whether the end-of-fill control at the hydrogen fuel dispenser 102 is within acceptable tolerance, whether the hydrogen fuel dispenser 102 is exceeding process limits and/or at least aborting fill operations where process limits are exceeded, etc. As described further herein, fill result component 128 may output one or multiple interfaces to indicate such considerations.

For example, a computing device 150 may be used to execute the validation tool 120. The computing device 150 may include a processor 152 to execute instructions for providing the validation tool 120, as described herein, a memory 154 for storing the instructions and/or related parameters of the validation tool 120, and/or the like. Moreover, computing device 150 may include a display 156 for displaying one or more interfaces or other representations of values, data, images, etc. described in conjunction with the validation tool 120. For example, processor 152 may send instructions to the display 156 for rendering the interfaces, etc. The display 156 may include a liquid crystal display (LCD), plasma display, or similar displays and/or a corresponding display interface, graphics processing unit (GPU), etc.

Figure 2:
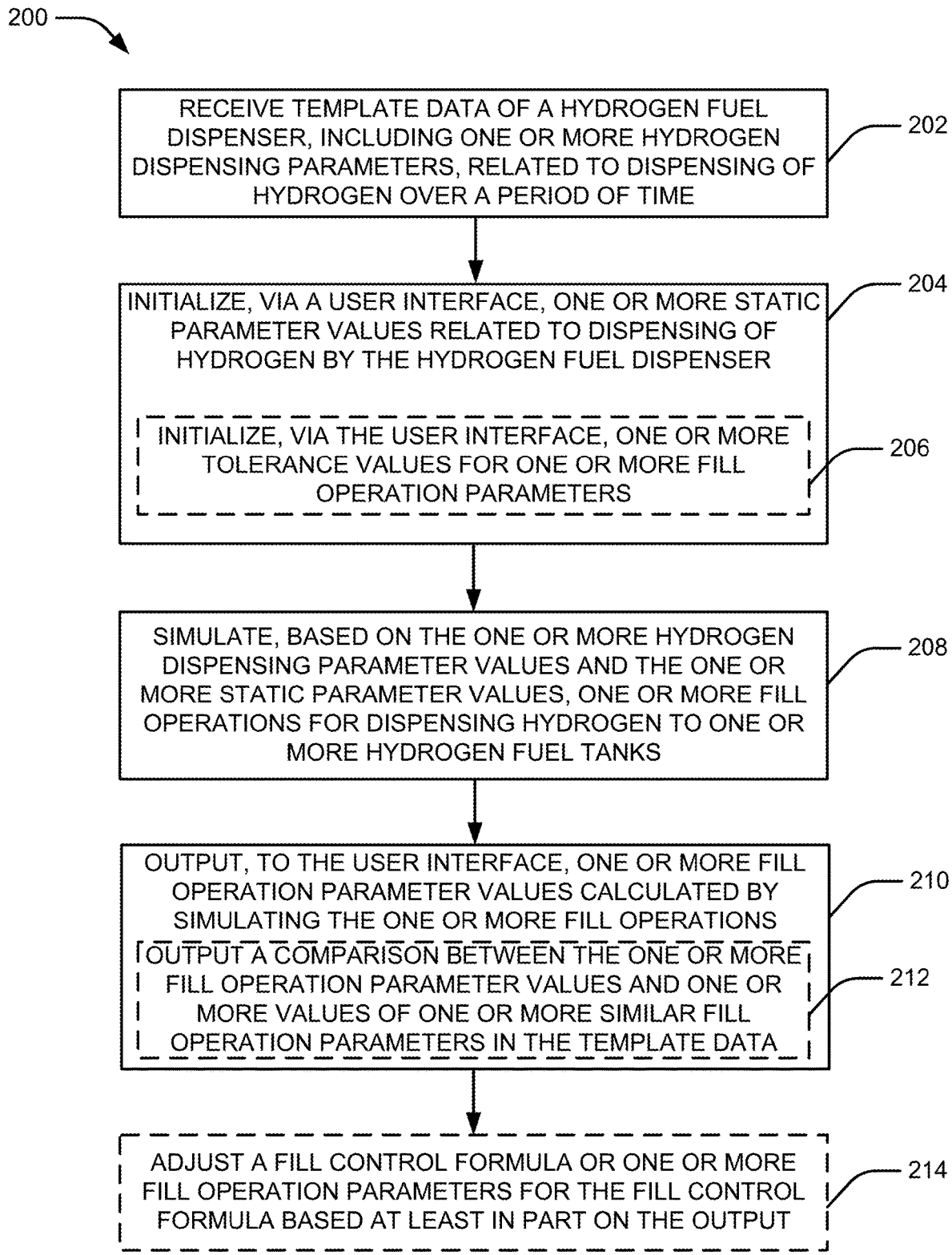
FIG. 2 illustrates a flowchart showing an example of a method for simulating fill operations of a hydrogen fuel dispenser according to aspects described herein.

FIG. 2 illustrates an example method 200 for performing validation of a hydrogen fuel dispenser. For example, method 200 may be performed by one or more processors 152 and/or memories 154 of a computing device 150 or other system, which may include a single computing device, multiple distributed computing devices, etc. In this regard, one or more blocks may be performed (e.g., in full or in part) on a given computing device, at a remote location (e.g., such that parameters may be shared with the given computing device), etc. In addition, FIG. 2 is described in conjunction with FIG. 1 and FIGS. 3-10, which present various examples of user interfaces. In FIGS. 7-10, which illustrate charts of values from simulations, some values of parameters may be similar, and thus respective lines may not be readily discernable.

In block 202, the method 200 may include receiving template data of a hydrogen fuel dispenser, including one or more hydrogen dispensing parameters, related to dispensing of hydrogen over a period of time. In an aspect, parameter receiving component 122, e.g., in conjunction with processor 152, memory 154, and validation tool 120, among other elements, may receive the template data of the hydrogen fuel dispenser (e.g., hydrogen fuel dispenser 102), including one or more hydrogen dispensing parameters 124, related to dispensing of hydrogen over a period of time. For example, parameter receiving component 122 may receive the template data as a log file from the hydrogen fuel dispenser 102, which may include a comma-separated value (CSV) file and/or spreadsheet file, among others, indicating various hydrogen dispensing parameter values for the dispensing of hydrogen fuel over the period of time. For example, the template data may include hydrogen dispensing parameter values as specified and/or measured at multiple time instances, where the time instances may correspond to a time interval (e.g., 1 second). As described, for example, the hydrogen dispensing parameters may include parameters related to (and reported by) a given vehicle tank during dispensing, such as a measured gas pressure at the vehicle tank during the fill operation, measured gas temperature at the vehicle tank during the fill operation, and a fueling command from the vehicle tank indicating whether or not to execute the fill operation, among other parameters, and/or may include parameters such as an outlet gas temperature at the hydrogen fuel dispenser 102, an outlet gas pressure at the hydrogen fuel dispenser 102, a fueling time for the hydrogen dispensing, etc.

For example, the hydrogen dispensing parameters may correspond to parameters input into a fill control formula 112 to determine one or more outputs for dispensing hydrogen fuel from the hydrogen fuel dispenser, such as a MC fill control formula for determining pressure, pressure ramp rates, etc., as defined in SAE J2601. In this specific example, the hydrogen dispensing parameters may include one or more of the following values:

| Parameter | Description |
| --- | --- |
| Fueling Time Indicator | A bit value indicating when dispensing is paused (e.g., to perform an integrity check |
| Mass Dispensed | A measure of hydrogen mass dispensed from the hydrogen fuel dispenser (e.g., in grams) |
| P_station | A pressure measured at the outlet of the hydrogen fuel dispenser (e.g., in mega Pascal (MPa)) |
| $\Delta P_{offset}$ | A value added to a pressure ramp value to calculate a control pressure |
| T_fuel_A for MAT | Fuel delivery temperature at a first sensor measured at the outlet of the hydrogen fuel dispenser for mass average temperature (MAT) calculation. |
| T_fuel_B for MAT | Fuel delivery temperature at a second sensor measured at the outlet of the hydrogen fuel dispenser for mass average temperature (MAT) calculation. |
| T_fuel_A for $h_{ave}$ | Fuel delivery temperature at a first sensor measured at the outlet of the hydrogen fuel dispenser for mass average enthalpy ($h_{ave}$) calculation. |
| T_fuel_B for $h_{ave}$ | Fuel delivery temperature at a second sensor measured at the outlet of the hydrogen fuel dispenser for $h_{ave}$ calculation. |
| Indicator Cons RR | A bit value indicating whether the conservative ramp rate (RR) is used (e.g., in a fill where the hydrogen fuel dispenser is in communication with the fuel tank, which can be referred to herein as a "non-comm fill") |
| Indicator Comm Fill | A bit value indicating whether the dispensing is part of a fill where the hydrogen fuel dispenser is in communication with the fuel tank, which can be referred to herein as a "comm fill" |
| MP | Pressure at the fuel tank (e.g., communicated by a vehicle in a comm fill) |
| MT | Gas Temperature in the fuel tank (e.g., communicated by a vehicle in a comm fill) |
| FC | Fuel command from the fuel tank indicating whether to continue or abort the fill operation (e.g., communicated by a vehicle in a comm fill) |
| P_limit_high | A tolerance from a current pressure defining an upper limit of a pressure corridor |
| P_limit_low | A tolerance from a current pressure defining a lower limit of the pressure corridor |

-continued

| Parameter | Description |
| --- | --- |
| $P_{target\_non\_comm}$ | A target pressure at the end-of-fill for a non-comm fill |
| $P_{target\_comm}$ | A target pressure at the end-of-fill for a comm fill |
| $P_{limit\_comm}$ | A maximum pressure at the end-of-fill for a comm fill |

For example, the hydrogen fuel dispenser 102 may collect these parameters over multiple time instances according to a time interval (e.g., every 1 second during one or more fuel fill operations or otherwise), and the parameter values may be provided, as template data, to the validation tool 120.

In block 204, the method 200 may include initializing, via a user interface, one or more static parameter values related to dispensing of hydrogen by the hydrogen fuel dispenser. In an aspect, parameter receiving component 122, e.g., in conjunction with processor 152, memory 154, validation tool 120, etc., may initialize, via the user interface (e.g., a user interface displayed by validation tool 120 on a display 156 of a computing device 150), one or more static parameter values (e.g., of static parameters 126) related to dispensing of hydrogen by the hydrogen fuel dispenser 102. For example, the static parameters may relate to dispensing hydrogen as well, but may be more static in nature and may not be included in the template data. For example, the static parameters may include an ambient temperature at the hydrogen dispenser during one or more fill operations, and an initial gas pressure at the one or more fill operations, among others.

FIG. 3 illustrates an example of a user interface 300 that may be displayed by the validation tool 120 (e.g., on display 156) to allow entry of the one or more static parameter values. For example, user interface 300 may allow for entry of parameters related to a MC fill control formula for determining pressure, pressure ramp rates, etc., as defined in SAE J2601. In this specific example, the static parameters, as shown on user interface 300, may include one or more of the following values:

| Parameter | Description |
| --- | --- |
| Dispenser Pressure Class | A value specifying a pressure class for the dispenser (e.g., a 70 MPa (700 bar) dispenser, 35 MPa (or 350 bar) dispenser, etc. |
| Ambient Temperature | A measure of ambient temperature at the start of fueling |
| CHSS Initial Pressure | Pressure of the vehicle tank system at the start of filling |
| CHSS Volume | A water volume of the vehicle tank system (e.g., in liters) |
| ΔP_low measured? | A bit indicator of whether ΔP_low is measured during the fueling |
| Flag Variable Cold Dispenser | A flag indicating whether the dispenser is in a cold state (e.g., based on recently performing another fill operation) |
| Flag Variable TopOff used | A flag indicating whether the dispenser may top off a tank (and reduce pressure towards the end-of-fill in this regard) |
| PRR_CAP_Factor | A parameter used to define the maximum pressure ramp rate allowed during the fill. |
| MAT_expected | A value representing the MAT expected of the dispenser at end-of-fill |
| Ending Pressure Control Option | A value indicating whether the MC Method or Ending Pressure Tables are used for ending pressure control at end-of-fill |
| SOC_target | A value representing a target state of charge (SOC) (e.g., between 95% and 100%) |
| MP or P_station used for comm end of fill | An indicator specifying whether the pressure used to check against the calculated pressure target is MP (measured vehicle pressured communicated from the vehicle in a comm fill) or P_station (the pressure at the dispenser) |
| Timestep_i frequency | A timestep value (e.g., in seconds) used to calculate t_final (a time parameter used in pressure ramp rate control) and T_cold (a calculated minimum gas temperature in the CHSS) |
| Dual T_fuel measurements | An indicator specifying whether two independent measurements are used at the dispenser for T_Fuel (e.g., T_Fuel_A and T_Fuel_B above) |
| Separate T_fuel values for MAT and $h_{ave}$ | An indicator specifying whether there are separate T_fuel values for MAT and $h_{ave}$, as described above. For example, if this indicator is specified, a sensor error for MAT may be added to T_fuel for MAT, and a sensor error for $h_{ave}$ may be subtracted from T_fuel for $h_{ave}$ |

The specific user interface 300 may also allow for entry of template data for the hydrogen fuel dispenser (e.g., by the Load station data button). For example, as described further herein, the static parameters may be used with the hydrogen dispensing parameters to simulate fill operations and collect output parameters over multiple time instances according to a time interval. In other example, at least a portion of such parameters may be received as dispensing parameters 124 (e.g., in template data), and the static parameters 126 may include one or more tolerance values for the dispensing parameters 124 and/or fill operation parameters 130, as described in further detail below.

described further herein, the validation tool 120 may ensure the fill operation parameters are within tolerance values and may generate an indication of whether or not the fill operation parameters are within the tolerance values as part of the simulation.

Figure 4:
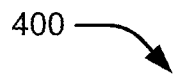
FIG. 4 illustrates an example of a GUI for indicating pass/fail criteria of certain fill operation parameters for simulating fill operations according to aspects described herein.

In a specific example, FIG. 4 illustrates an example of a user interface 400 for specifying tolerance values for a protocol calculation check. For example, selecting the "PASS/FAIL Criteria for Protocol Calculations Check" button on user interface 300 may result in displaying user interface 400 on display 156. User interface 400 may specifically allow for entering one or more of the following values:

| Parameter | Description |
| --- | --- |
| P_limit_high and P_limit_low | A value indicating a threshold tolerable differential between the station logged values of P_limit_high and P_limit_low and the tool's calculated values. |
| Time space for above difference to fail | A value indicating a time span for which the differential between the station logged values of P_limit_high and P_limit_low and the tool's calculated values must remain outside of the threshold tolerable differential to indicate failure |
| P_target_non_comm difference | A value indicating a threshold tolerable differential between the station logged value of P_target_non_comm and the tool's calculated value. |
| P_limit_comm_difference | A value indicating a threshold tolerable differential between the station logged value of P_limit_comm and the tool's calculated value. |
| Time span for P_target_non_comm and P_limit_comm to fail | A value indicating a time span for which the differential between the station logged values of P_target_non_comm and P_limit_comm and the tool's calculated values must remain outside of the threshold tolerable differential to indicate failure |
| P_target_comm difference | A value indicating a threshold tolerable differential between the station logged value of P_target_ comm and the tool's calculated value |
| Time span for P_target_comm to fail | A value indicating a time span for which the differential between the station logged value of P_target_ comm and the tool's calculated value must remain outside of the threshold tolerable differential to indicate failure |
| Use values from CSA HGV 4.3 Standard | An indicator to populate the above values with values specified in CSA HGV 4.3 standard |

In block 206, the method 200 may optionally include initializing, via the user interface, one or more tolerance values for one or more fill operation parameters. In an aspect, parameter receiving component 122, e.g., in conjunction with processor 152, memory 154, validation tool 120, etc., may initialize, via the user interface (e.g., as displayed on display 156), the one or more tolerance values for the one or more fill operation parameters. For example, the one or more tolerance values may be included in the one or more static parameters 126, and thus initializing the one or more static parameters at block 204 may include or consist of initializing the one or more tolerance values at block 206. For example, the one or more tolerance values may be used to define acceptable limit values for one or more fill operation parameters 130 when simulating the fill operation (e.g., and/or when comparing the fill operation parameters 130 from the simulated fill operation to those of actual fill operations indicated in the template data from the hydrogen fuel dispenser 102, as described further herein). In an example, the one or more tolerance values may correspond to ensuring the hydrogen fuel dispenser 102 is operating according to protocol calculations, constraints, or specifications (e.g., according to a MC fill protocol defined in SAE J2601). In another example, the one or more tolerance values may correspond to determining whether an end-of-fill check passes. In either case, during simulation, as FIG. 5 illustrates another example of a user interface 500 for specifying tolerance values for a protocol calculation check. For example, selecting the "PASS/FAIL Criteria for End-of-Fill Check" button on user interface 300 may result in displaying user interface 500 on display 156. User interface 500 may specifically allow for entering one or more of the following values:

| Parameter | Description |
| --- | --- |
| Non-Comm pressure target overshoot | A value indicating a maximum tolerable dispenser pressure over the station logged P_target_non_comm value at end-of-fill in a non-comm fill |
| Non-Comm pressure target undershoot | A value indicating a minimum tolerable dispenser pressure under the station logged P_target_non_comm value at end-of-fill in a non-comm fill |
| Comm pressure target overshoot | A value indicating a maximum tolerable dispenser pressure over the station logged P_target_comm value at end-of-fill in a comm fill |
| Comm pressure target undershoot | A value indicating a minimum tolerable dispenser pressure under the station logged P_target_comm value at end-of-fill in a comm fill |
| Use values from CSA HGV 4.3 Standard | An indicator to populate the above values with values specified in CSA HGV 4.3 standard |

In these specific examples, the validation tool 120 may compare fill operation parameters (e.g., fill operation parameters 130 from the simulation, fill operation parameters indicated in the template data in actual fill operations at the hydrogen fuel dispenser 102, a difference between these values, etc.) to the tolerance values specified in user interface(s) 400 and/or 500 to determine whether to notify of a pass or fail scenario for protocol calculations or end-of-fill check.

In block 208, the method 200 may include simulating, based on the one or more hydrogen dispensing parameter values and the one or more static parameter values, one or more fill operations for dispensing hydrogen to one or more hydrogen fuel tanks. In an aspect, fill result component 128, e.g., in conjunction with processor 152, memory 154, validation tool 120, etc., may simulate, based on the one or more hydrogen dispensing parameter values (e.g., of dispensing parameters 124) and the one or more static parameter values (e.g., of static parameters 126), one or more fill operations for dispensing hydrogen to one or more hydrogen fuel tanks. For example, fill result component 128 may simulate the one or more fill operations based on the fill control formula 112 to determine whether the hydrogen fuel dispenser 102 is operating according to a corresponding protocol. For example, fill result component 128 may simulate the one or more fill operations by inserting dispensing parameters 124 and/or static parameters 126 into the fill control formula 112 to determine one or more fill operation parameters 130. For example, the fill control formula 112 may correspond to a MC fill control protocol formula or table-based protocol formula defined in SAE J2601. In one example, in user interface 300, activating the "Calculate" button may cause the simulation to begin. Moreover, as described, the static parameters 126 can include or consist of one or more tolerance values, and the simulation can include determining whether dispensing parameters 124 and/or fill operation parameters 130 comply with the threshold values.

In block 210, the method 200 may include outputting, to the user interface, one or more fill operation parameter values calculated by simulating the one or more fill operations.

In an aspect, fill result component 128. e.g., in conjunction with processor 152, memory 154, validation tool 120, etc., may output, to the user interface (e.g., on display 156), the one or more fill operation parameter values (e.g., of fill operation parameters 130) calculated by simulating the one or more fill operations. For example, the validation tool 120 may output the one or more fill operation parameter values as a result of the simulation, and may output the values in a table format, in a chart (e.g., over time instances), etc., as further shown and described herein.

In one specific example, FIG. 6 illustrates an example of a user interface 600 for displaying fill parameter values from a simulation of one or more fill operations (e.g., on display 156). As shown, the user interface 600 may display values of dispensing parameters 124 and/or possible static parameters 126, CHSS capacity category coefficients (e.g., used as input to the fill control formula), and/or a set of parameter values including dispensing parameters 124 and/or fill operation parameters 130 related to the simulated fill operation(s) performed by the validation tool 120 (e.g., time, fueling time indicator, mass dispensed, mass flow, etc.). In one example, in user interface 300, activating the "Show calculated values" button may cause display of user interface 600. Additionally, for example, validation tool 120 may provide an option to export the values to a file (e.g., activating the "Export calculated values" button in user interface 300 may cause exporting the values to a file).

In an example, outputting the fill operation parameter values at block 210 may optionally include, at block 212, outputting, to the user interface, a comparison between the one or more fill operation parameter values and one or more values of one or more similar fill operation parameters in the template data. In an aspect, fill result component 128, e.g., in conjunction with processor 152, memory 154, validation tool 120, etc., may output, to the user interface (e.g., on display 156), a comparison between the one or more fill operation parameter values (e.g., of fill operation parameters 130) and one or more values of one or more similar fill operation parameters in the template data (e.g., received with dispensing parameters 124 from hydrogen fuel dispenser 102). For example, this may include outputting the comparison as a table of values, a chart of one or more values (e.g., over time), etc.

Figure 7:
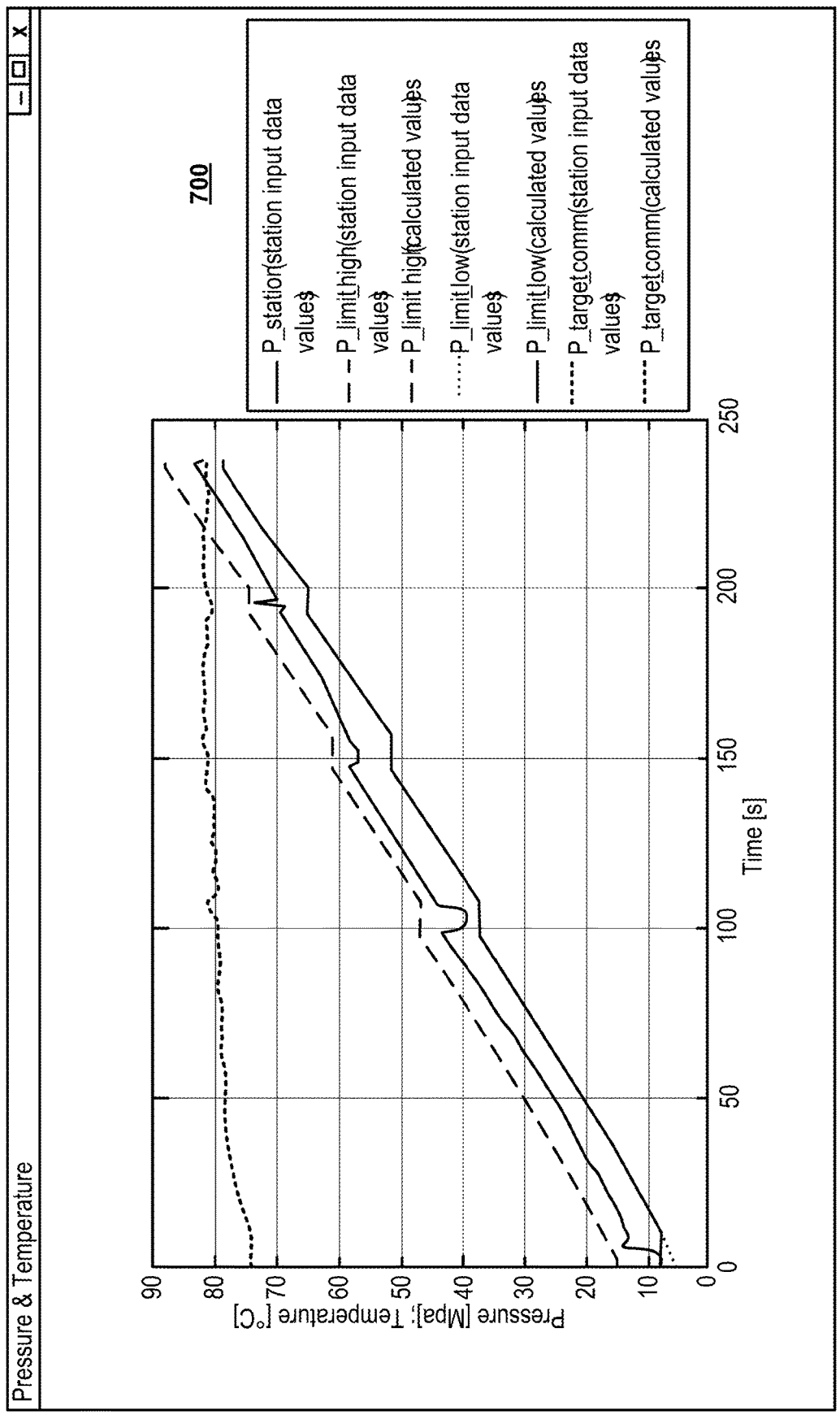
FIG. 7 illustrates an example of a GUI for plotting fill operation parameters in simulating fill operations according to aspects described herein.

In one specific example, FIG. 7 illustrates an example of a user interface 700 for displaying a chart comparing one or more fill operation parameter values in a chart (e.g., on display 156). As shown, the user interface 700 may display various values corresponding to fill operation parameters, dispenser parameters, static parameters, etc. For example, user interface 700 may display a station pressure (P_station) based on dispensing parameters 124 from the template data, a high pressure limit (P_limit_high) station input data values (e.g., as received in dispenser parameters 124), a P_limit_high calculated value (e.g., calculated during the simulation, e.g., as a fill operation parameter 130), a low pressure limit (P_limit_low) station input data values (e.g., as received in dispenser parameters 124), a P_limit_low calculated value (e.g., calculated during the simulation, e.g., as a fill operation parameter 130), and a target pressure for comm fill (P_target_comm) as calculated during the simulation (e.g., as a fill operation parameter 130). In an example, user interface 700 may be generated based at least in part on a customized chart engine that may allow a user to specify which values from the dispensing parameters 124 and/or fill operation parameters 130 to include in the chart. Additionally, the chart may represent the values over time, which may correspond to the time instance for the associated data (e.g., as shown in user interface 600). In one example, in user interface 300, activating the "Plot calculated values" button may cause display of user interface 700 and/or an interface to generate customized charts.

Figure 8:
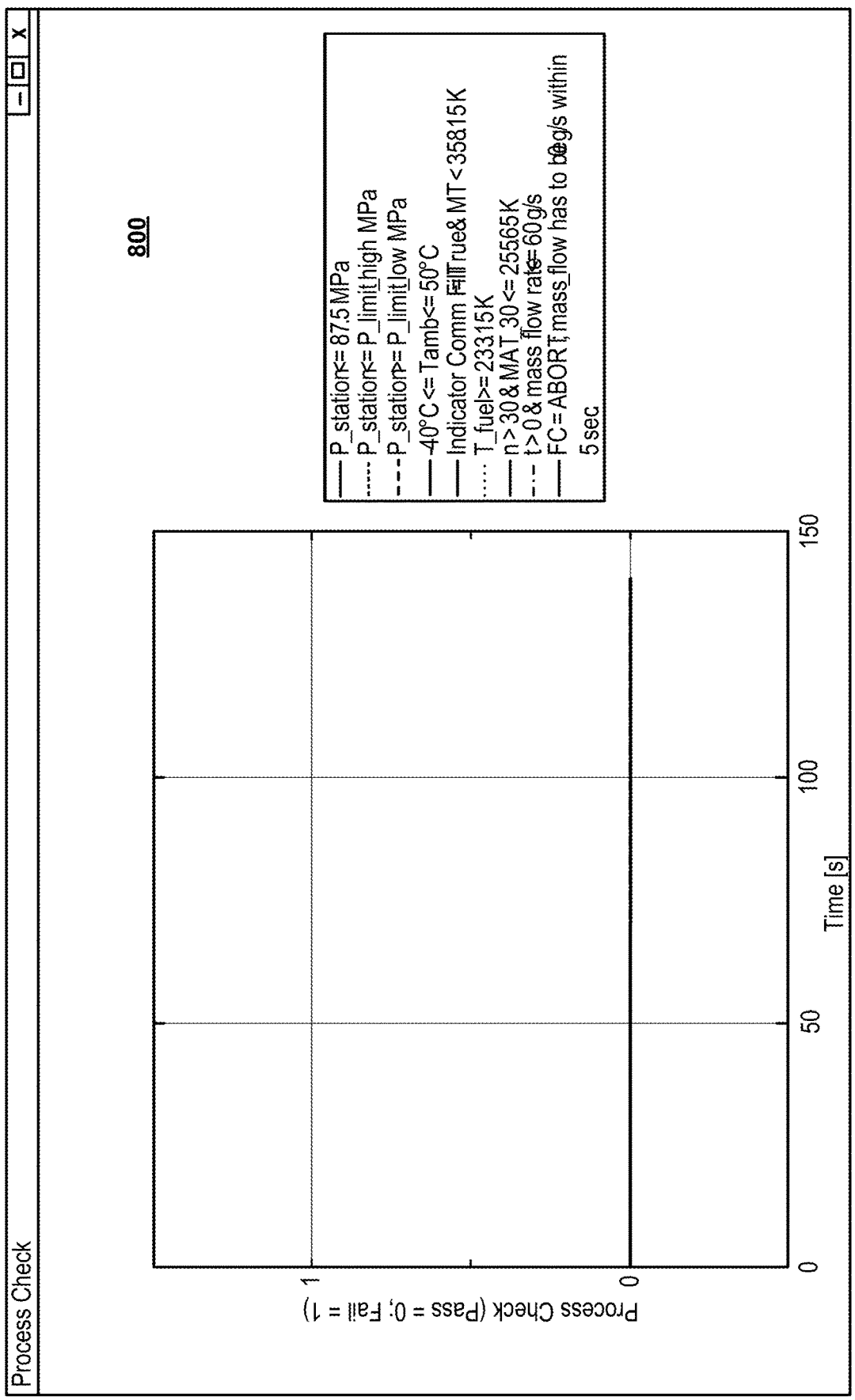
FIG. 8 illustrates an example of a GUI for plotting fill operation parameter pass/fail status in simulating fill operations according to aspects described herein.

In another specific example, FIG. 8 illustrates an example of a user interface 800 for displaying a chart comparing one or more fill operation parameter values in a chart (e.g., on display 156) as part of a process check. As shown, the user interface 800 may display a pass/file value for certain fill operation parameters, dispenser parameters, etc. For example, user interface 800 may display a plot related to a process check to check whether process limits were respected (e.g., as defined in a user interface, such as user interface 400 or otherwise as defined in the fill control formula 112 and/or the corresponding formula used by the validation tool 120). If one or more of the process limits are exceeded during the simulation and/or as indicated in parameter values received from the template data, a "1" for that value may be plotted at the corresponding time instance. If the process limits are not exceeded, a value of "0" may be plotted. A "good" fill, from a performance standpoint, may be for all parameters to have a value of "0" throughout the fill. An "acceptable" fill, may be for the fill to have stopped within 5 seconds after the first time instance beyond one of the process limits. An "unacceptable" fill may be for the fill to continue after a time instance beyond of one or more of the process limits. For example, user interface 800 may display pass/fail values for a dispenser pressure (P_station) <=87.5 MPa, P_station<=P_limit_high, P_station>=P_limit_low, ambient temperature (Tamb) between 40 and 50 degrees Celsius, whether tank temperature (MT)<358.15 Kelvin (K) and whether fuel temperature (T_fuel) is greater than or equal to 25.65K for a comm fill (where Indicator Comm Fill) is true, whether n>30 and MAT_30 is less than or equal to 255.65K, whether mass flow rate is less than or equal to 60 gallons per second where temperature is greater than 0, whether after an ABORT command received from a fuel tank the mass_flow is 0 gallons per second within 5 seconds. Additionally, the chart may represent the values over time, which may correspond to the time instance for the associated data (e.g., as shown in user interface 600). In one example, in user interface 300, activating the "Plot calculated values" button may cause display of user interface 800 and/or an interface to generate customized charts, as described.

Figure 9:
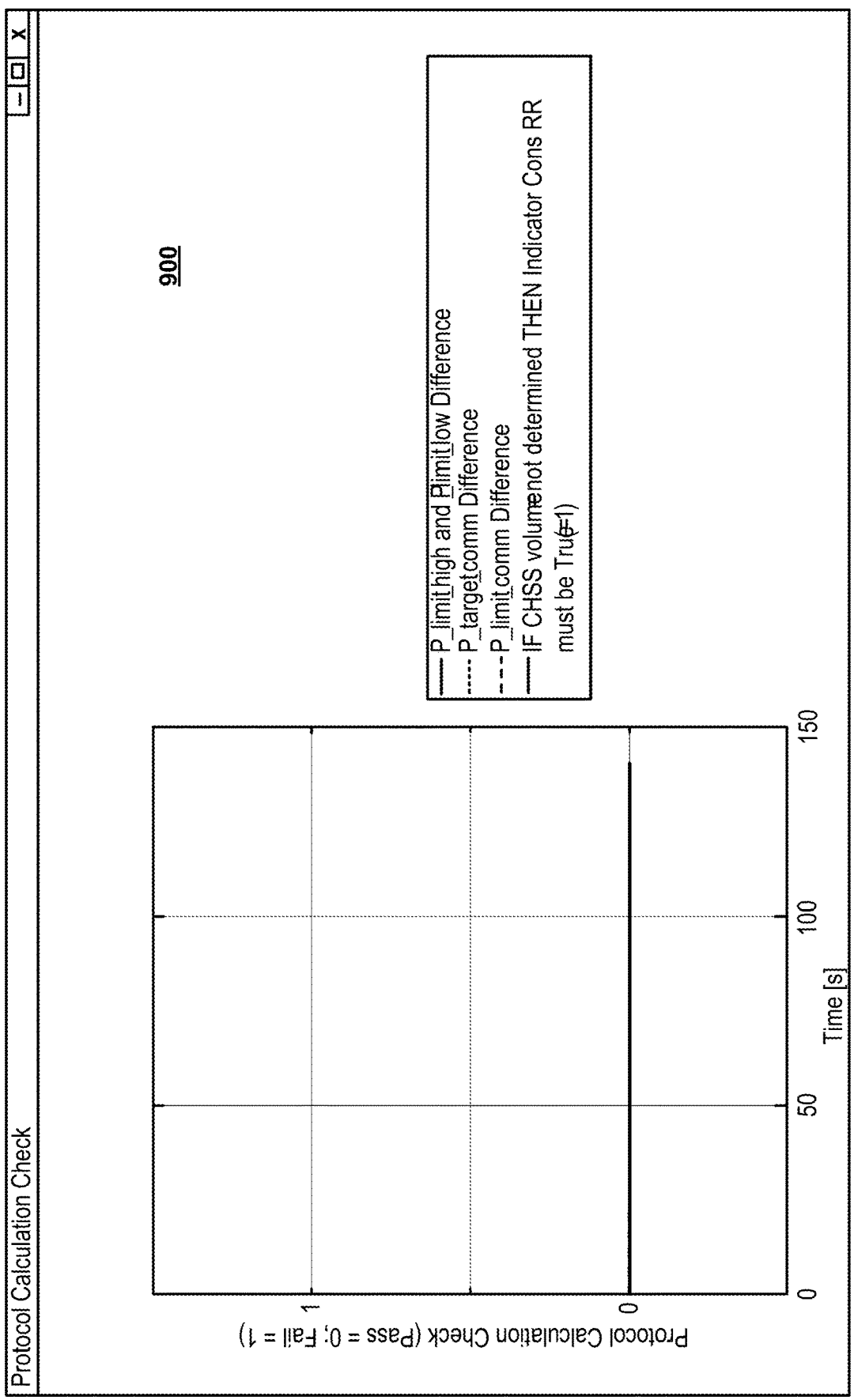
FIG. 9 illustrates an example of a GUI for plotting fill operation parameter pass/fail status in a protocol calculations check according to aspects described herein.

In another specific example, FIG. 9 illustrates an example of a user interface 900 for displaying a chart comparing one or more fill operation parameter values in a chart (e.g., on display 156) as part of a protocol calculation check. For example, the plot on user interface 900 may relate to checking that the fill control formula 112 was implemented correctly, in that the difference between the fill operation parameters 130 resulting from the simulation and the station data logged parameters from the template data are within pass/fail criteria thresholds (e.g., entered in the "PASS/FAIL Criteria for Protocol Calculations Check" is user interface 400, where "0" indicates a "PASS" and "1" indicates a "FAIL." For example, user interface 900 may display pass/fail values for whether a P_limit_high and P_limit_low difference (e.g., between the fill operation parameters 130 from the simulation and those from template data) are within the specified tolerance at a given time instance, whether the P_target_comm difference is within the tolerance, whether the P_limit_comm difference is within the threshold, and whether Indicator Cons RR is true where CHSS volume is not determined for a time instance. In one example, in user interface 300, activating the "Plot calculated values" button may cause display of user interface 900 and/or an interface to generate customized charts.

Figure 10:
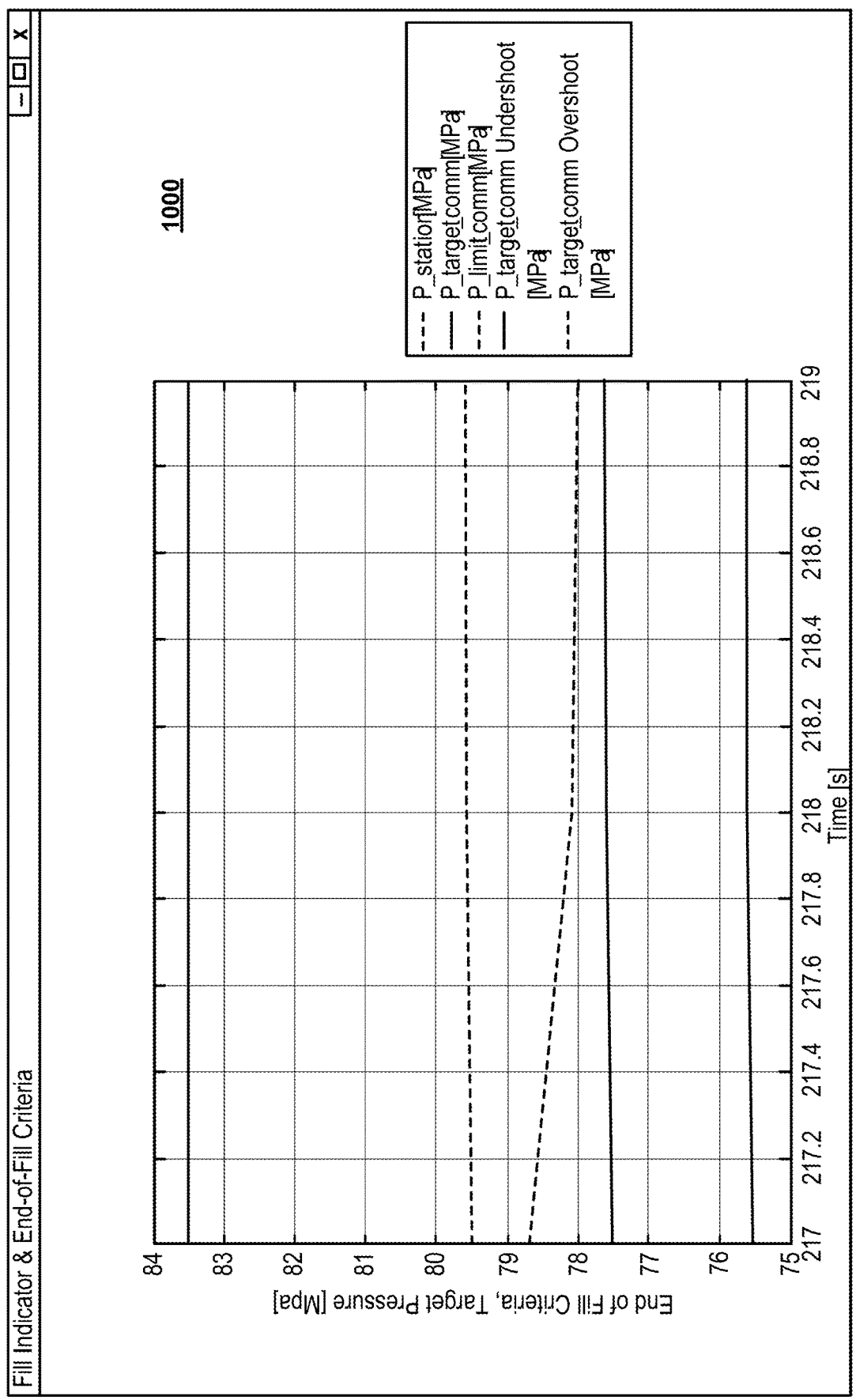
FIG. 10 illustrates an example of a GUI for plotting fill operation parameter pass/fail status in an end-of-fill check according to aspects described herein.

In another specific example, FIG. 10 illustrates an example of a user interface 1000 for displaying a chart comparing one or more fill operation parameter values in a chart (e.g., on display 156) as part of a fill indicator and end-of-fill criteria check. For example, the plot on user interface 1000 may relate to checking dispenser pressure (or tank pressure (MP), depending on what is utilized by the dispenser, and may be specified using user interface 300. In any case, in this user interface 1000, for comm fills, the dispenser pressure (P_station), the dispenser calculated comm pressure target (P_target_comm), the dispenser calculated comm pressure limit (P_limit_comm), the pressure target minus undershoot (P_target_comm Undershoot), and the pressure target plus overshoot (P_target_comm Overshoot) may be plotted over time. For non-comm fills, P_station, the dispenser calculated non-comm pressure target (P_target_non_comm), the pressure target minus undershoot (P_target_non_comm Undershoot), and the pressure target plus overshoot (P_target_non_comm Overshoot) may be plotted. The graph may be plotted starting at the highest dispenser pressure recorded until the end of the data. The logged data may stop within a few seconds after the highest dispenser pressure, as this may indicate the end of the fill. If the highest dispenser pressure data point is also the last data point, the graph may be just a single point. A "pass" is if the dispenser pressure or MP falls within the overshoot and undershoot values at the left hand side of the graph. In one example, in user interface 300, activating the "Plot calculated values" button may cause display of user interface 1000 and/or an interface to generate customized charts.

For example, the validation tool 120 may allow for displaying substantially any plot of values for comparison (e.g., comparison between dispensing parameters 124 and fill operation parameters 130) and/or values with respect to a pass/fail status at one or more time instances. In another example, activating the "Show equations" button on user interface 300 may cause a list of equations used in the fill control formula of the validation tool 120 to be displayed.

In other examples, outputting the fill operation parameter values at block 210 may optionally include outputting an alert corresponding to one or more fill operation parameter values exceeding a pass/fail tolerance. For example, the alert may be an interface displayed on the display 156 during or after the simulation, based on requesting alert status, etc.

In block 214, the method 200 may include adjusting a fill control formula or one or more fill operation parameters for the fill control formula based at least in part on the output. In an aspect, formula adjusting component 132, e.g., in conjunction with processor 152, memory 154, validation tool 120, etc., may adjust the fill control formula (e.g., of the validation tool 120 and/or fill control formula 112) or one or more fill operation parameters (e.g., fill operation parameters 130) for the fill control formula based at least in part on the output. For example, formula adjusting component 132 may adjust the one or more fill operation parameters based on pass/fail of one or more of the fill operation parameters during the one or more simulated fill operations.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. An example of such a computer system 1100 is shown in FIG. 11.

Figure 11:
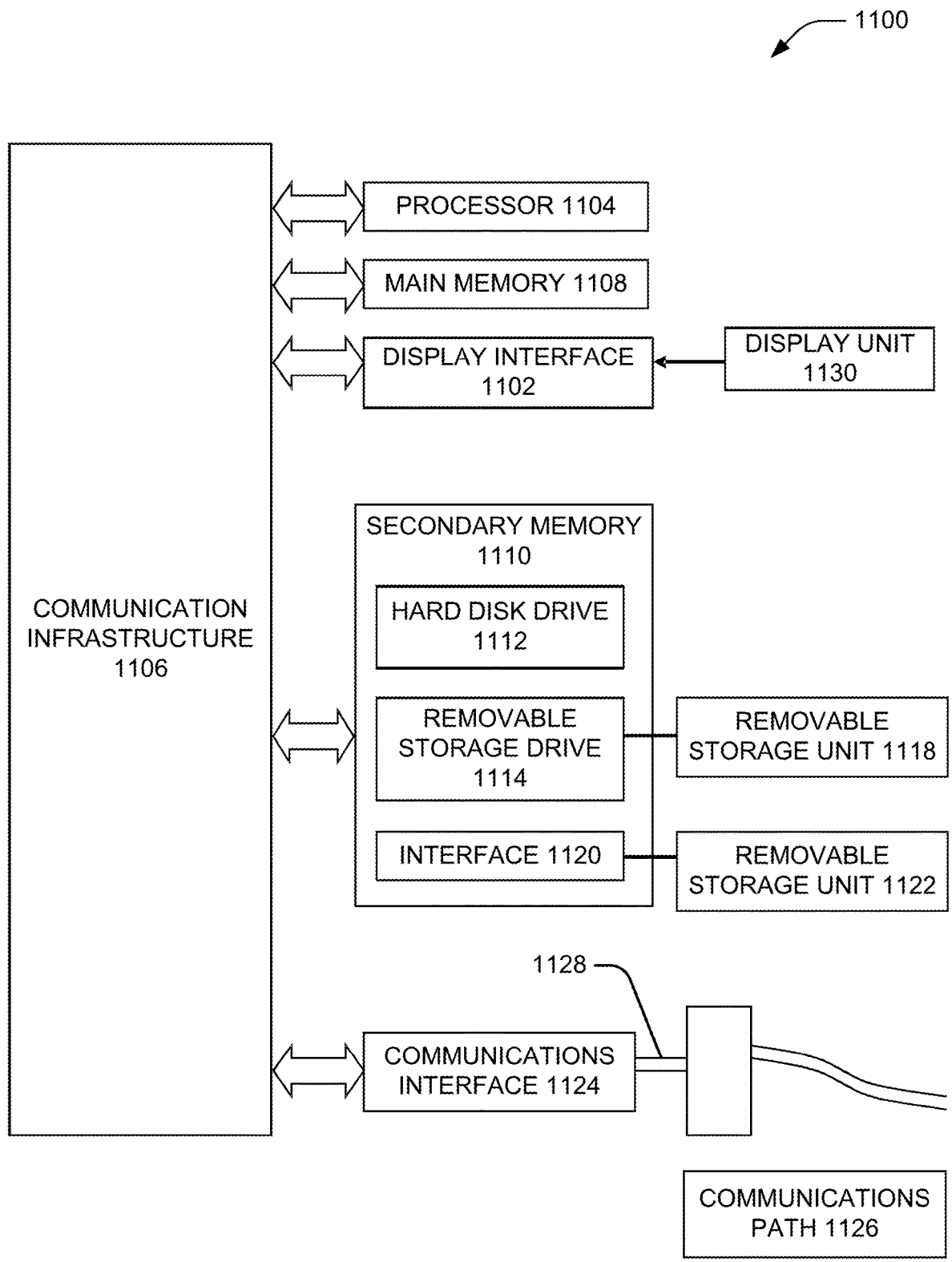
FIG. 11 presents an example system diagram of various hardware components and other features according to aspects described herein.

FIG. 11 presents an example system diagram of various hardware components and other features, for use in accordance with an aspect of the present disclosure. Computer system 1100 includes one or more processors, such as processor 1104. The processor 1104 is connected to a communication infrastructure 1106 (e.g., a communications bus, cross-over bar, or network). In one example, processor 302 may include processor 1104. Various software aspects are described in terms of this example computer system. After reading this description, it will become apparent to a person skilled in the relevant art(s) how to implement aspects described herein using other computer systems and/or architectures.

Computer system 1100 may include a display interface 1102 that forwards graphics, text, and other data from the communication infrastructure 1106 (or from a frame buffer not shown) for display on a display unit 1130. Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc., which is read by and written to removable storage drive 1114. The removable storage unit 1118 may include a computer usable storage medium having stored therein computer software and/or data.

In alternative aspects, secondary memory 1110 may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100. In an example, memory 304 may include one or more of main memory 1108, secondary memory 1110, removable storage drive 1114, removable storage unit 1118, removable storage unit 1122, etc.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (e.g., channel) 1126. This path 1126 carries signals 1128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1180, a hard disk installed in hard disk drive 1170, and signals 1128. These computer program products provide software to the computer system 1100. Aspects described herein may be directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform various features in accordance with aspects described herein. In particular, the computer programs, when executed, enable the processor 1104 to perform such features. Accordingly, such computer programs represent controllers of the computer system 1100. Computer programs may include validation tool 120, etc., as described herein.

In variations where aspects described herein are implemented using software, the software may be stored in a computer program product and loaded into computer system 1100 using removable storage drive 1114, hard disk drive 1112, or communications interface 1120. The control logic (software), when executed by the processor 1104, causes the processor 1104 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 12:
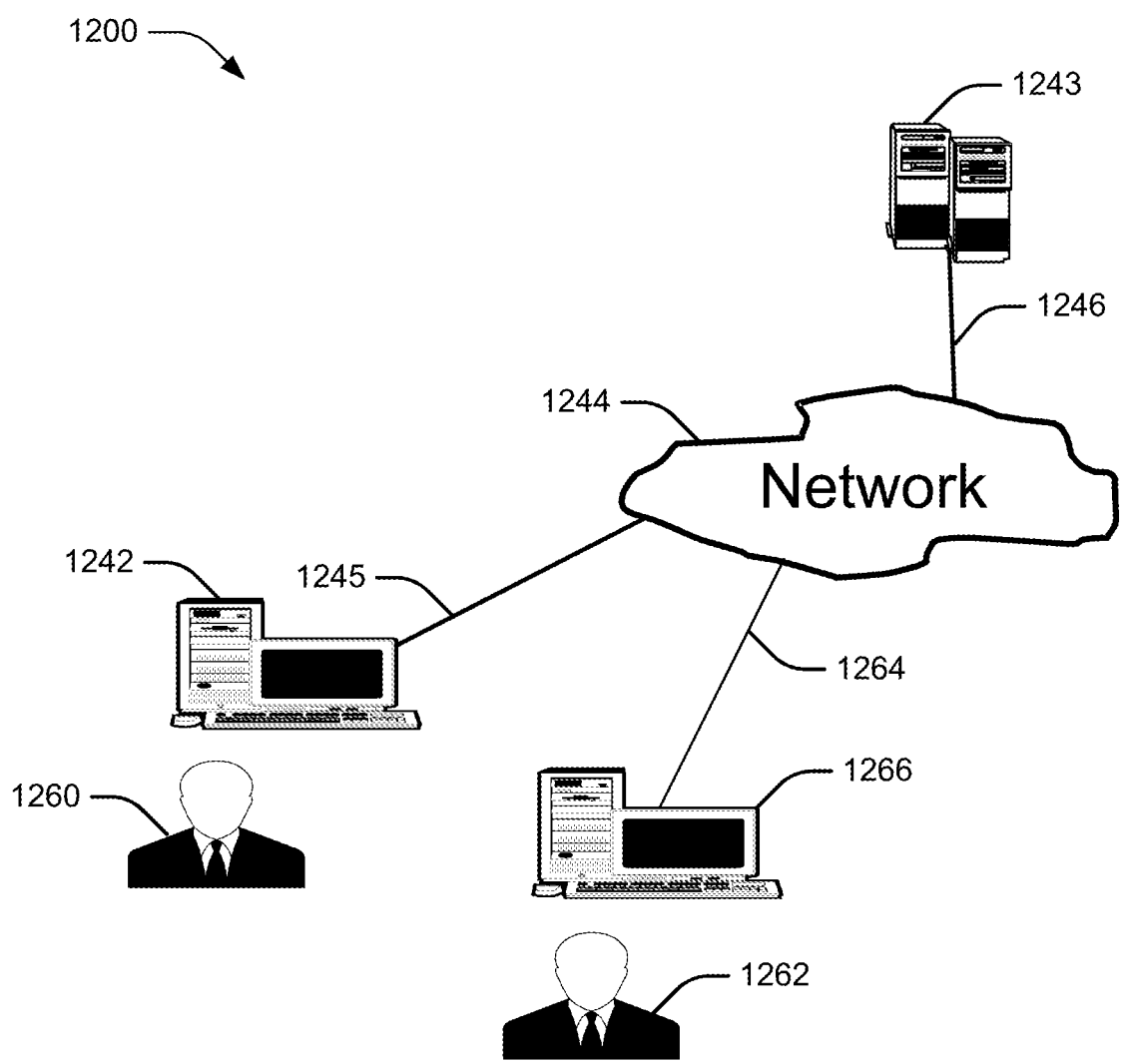
FIG. 12 is a block diagram of various example system components according to aspects described herein.

FIG. 12 is a block diagram of various example system components, in accordance with an aspect. FIG. 12 shows a communication system 1200 usable in accordance with aspects described herein. The communication system 1200 includes one or more accessors 1260, 1262 (also referred to interchangeably herein as one or more "users") and one or more terminals 1242, 1266. For example, terminals 1242, 1266 may be computing devices that may include a processor (e.g., processor 152), memory (e.g., memory 154).

In one aspect, data for use in accordance with aspects described herein is, for example, input and/or accessed by accessors 1260, 1262 via terminals 1242, 1266, such as personal computers (PCs), minicomputers, mainframe computers, microcomputers, telephonic devices, or wireless devices, such as personal digital assistants ("PDAs") or a hand-held wireless devices coupled to a server 1243, such as a PC, minicomputer, mainframe computer, microcomputer, or other device having a processor and a repository for data and/or connection to a repository for data, via, for example, a network 1244, such as the Internet or an intranet, and couplings 1245, 1246, 1264. The couplings 1245, 1246, 1264 include, for example, wired, wireless, or fiberoptic links. In another example variation, the method and system in accordance with aspects described herein operate in a stand-alone environment, such as on a single terminal.

The aspects discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

Various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for validating a fill control formula used by a hydrogen dispenser for dispensing hydrogen, comprising:
receiving template data of the hydrogen dispenser related to dispensing of hydrogen by the hydrogen dispenser over a period of time, wherein the template data includes one or more hydrogen dispensing parameter values of the hydrogen dispenser that are measured at the hydrogen dispenser during dispensing of hydrogen to a hydrogen fuel tank;
initializing, via a user interface, one or more static parameter values related to dispensing of hydrogen by the hydrogen dispenser, wherein the one or more status parameter values include one or more tolerance values for at least one of the one or more fill operation parameter values, wherein the one or more tolerance values indicate a high pressure or a low pressure tolerated at an outlet of the hydrogen dispenser during the one or more fill operations;

simulating, based on the one or more hydrogen dispensing parameter values and the one or more static parameter values, one or more fill operations for dispensing hydrogen to one or more hydrogen fuel tanks based on the fill control formula utilized in the hydrogen dispenser; and outputting, to the user interface, a comparison of one or more fill operation parameter values calculated by simulating the one or more fill operations and one or more values of one or more similar fill operation parameters in the template data, wherein outputting the comparison comprises outputting an alert where the comparison exceeds the one or more tolerance values.

2. The method of claim 1, wherein the one or more static parameter values include one or more of an ambient temperature, or an initial gas pressure.

3. The method of claim 1, wherein the one or more hydrogen dispensing parameter values include one or more tank parameter values received from the one or more hydrogen fuel tanks.

4. The method of claim 3, wherein the one or more tank parameter values received from the one or more hydrogen fuel tanks include one or more of a measured gas pressure, measured gas temperature, or a fueling command.

5. The method of claim 1, wherein the one or more hydrogen dispensing parameter values include one or more of an outlet gas temperature at the hydrogen dispenser, an outlet gas pressure at the hydrogen dispenser, or a fueling time for the hydrogen dispensing.

6. The method of claim 1, wherein outputting the comparison comprises outputting a chart illustrating the one or more fill operation parameter values calculated by simulating the one or more fill operations and the one or more values of the one or more similar fill operation parameters in the template data over the period of time.

7. An apparatus for validating a fill control formula used by a hydrogen dispenser for dispensing hydrogen, comprising:

a display;
a memory; and
at least one processor coupled to the memory, wherein the at least one processor is configured to:
  receive template data of the hydrogen dispenser related to dispensing of hydrogen by the hydrogen dispenser over a period of time, wherein the template data includes one or more hydrogen dispensing parameter values of the hydrogen dispenser that are measured at the hydrogen dispenser during dispensing of hydrogen to a hydrogen fuel tank;
  initialize, via a user interface displayed on the display, one or more static parameter values related to dispensing of hydrogen by the hydrogen dispenser, wherein the one or more status parameter values include one or more tolerance values for at least one of the one or more fill operation parameter values, wherein the one or more tolerance values indicate a high pressure or a low pressure tolerated at an outlet of the hydrogen dispenser during the one or more fill operations;
  simulate, based on the one or more hydrogen dispensing parameter values and the one or more static parameter values, one or more fill operations for dispensing hydrogen to one or more hydrogen fuel tanks based on the fill control formula utilized in the hydrogen dispenser; and
  output, to the user interface displayed on the display, a comparison of one or more fill operation parameter values calculated by simulating the one or more fill operations and one or more values of one or more similar fill operation parameters in the template data, wherein the at least one processor is configured to output the comparison as an alert where the comparison exceeds the one or more tolerance values.

8. The apparatus of claim 7, wherein the one or more static parameter values include one or more of an ambient temperature, or an initial gas pressure.

9. The apparatus of claim 7, wherein the one or more hydrogen dispensing parameter values include one or more tank parameter values received from the one or more hydrogen fuel tanks.

10. The apparatus of claim 9, wherein the one or more tank parameter values received from the one or more hydrogen fuel tanks include one or more of a measured gas pressure, measured gas temperature, or a fueling command.

11. The apparatus of claim 7, wherein the one or more hydrogen dispensing parameter values include one or more of an outlet gas temperature at the hydrogen dispenser, an outlet gas pressure at the hydrogen dispenser, or a fueling time for the hydrogen dispensing.

12. The apparatus of claim 7, wherein the at least one processor is configured to output the comparison at least in part by outputting a chart illustrating the one or more fill operation parameter values calculated by simulating the one or more fill operations and the one or more values of the one or more similar fill operation parameters in the template data over the period of time.

13. A non-transitory computer-readable storage medium comprising computer-executable code for validating a fill control formula used by a hydrogen dispenser for dispensing hydrogen, the code comprising code for:

receiving template data of the hydrogen dispenser related to dispensing of hydrogen by the hydrogen dispenser over a period of time, wherein the template data includes one or more hydrogen dispensing parameter values of the hydrogen dispenser that are measured at the hydrogen dispenser during dispensing of hydrogen to a hydrogen fuel tank;

initializing, via a user interface, one or more static parameter values related to dispensing of hydrogen by the hydrogen dispenser, wherein the one or more status parameter values include one or more tolerance values for at least one of the one or more fill operation parameter values, wherein the one or more tolerance values indicate a high pressure or a low pressure tolerated at an outlet of the hydrogen dispenser during the one or more fill operations;

simulating, based on the one or more hydrogen dispensing parameter values and the one or more static parameter values, one or more fill operations for dispensing hydrogen to one or more hydrogen fuel tanks based on the fill control formula utilized in the hydrogen dispenser; and outputting, to the user interface, a comparison of one or more fill operation parameter values calculated by simulating the one or more fill operations and one or more values of one or more similar fill operation parameters in the template data, wherein outputting the comparison comprises outputting an alert where the comparison exceeds the one or more tolerance values.

14. The non-transitory computer-readable storage medium of claim 13, wherein the one or more static parameter values include one or more of an ambient temperature, or an initial gas pressure.

15. The non-transitory computer-readable storage medium of claim 13, wherein the one or more hydrogen dispensing parameter values include one or more tank parameter values received from the one or more hydrogen fuel tanks.

16. The non-transitory computer-readable storage medium of claim 15, wherein the one or more tank parameter values received from the one or more hydrogen fuel tanks include one or more of a measured gas pressure, measured gas temperature, or a fueling command.

17. The non-transitory computer-readable storage medium of claim 13, wherein the one or more hydrogen dispensing parameter values include one or more of an outlet gas temperature at the hydrogen dispenser, an outlet gas pressure at the hydrogen dispenser, or a fueling time for the hydrogen dispensing.

* * * * *